United States Patent [19]
Moslehi et al.

[11] Patent Number: 6,038,359
[45] Date of Patent: Mar. 14, 2000

[54] MODE-ROUTED FIBER-OPTIC ADD-DROP FILTER

[75] Inventors: Behzad Moslehi, Mountain View; Richard James Black, Palo Alto; Herbert John Shaw, Stanford, all of Calif.

[73] Assignee: Intelligent Fiber Optic Systems, MT. View, Calif.

[21] Appl. No.: 09/108,128

[22] Filed: Jun. 4, 1998

Related U.S. Application Data

[62] Division of application No. 08/813,165, Mar. 7, 1997, Pat. No. 5,940,556.

[51] Int. Cl.$^7$ ....................................................... G02B 6/26
[52] U.S. Cl. ................................. 385/42; 385/24; 385/27; 385/28; 385/37
[58] Field of Search ................................... 385/42, 27, 24, 385/28, 29, 30, 31, 32, 37, 38, 39

[56] References Cited

U.S. PATENT DOCUMENTS

| | | | |
|---|---|---|---|
| 5,448,658 | 9/1995 | Lerminiaux et al. | 385/24 X |
| 5,493,625 | 2/1996 | Glance | 385/24 |

*Primary Examiner*—Phan T. H. Palmer
*Attorney, Agent, or Firm*—Jay A. Chesavage

[57] ABSTRACT

New elements mode-converting two-mode grating and mode-filtering two-mode coupler are disclosed and used as elements in a system for communications, add-drop filtering, and strain sensing. Methods of fabrication for these new two-mode gratings and mode-filtering two-mode couplers are also disclosed.

26 Claims, 3 Drawing Sheets

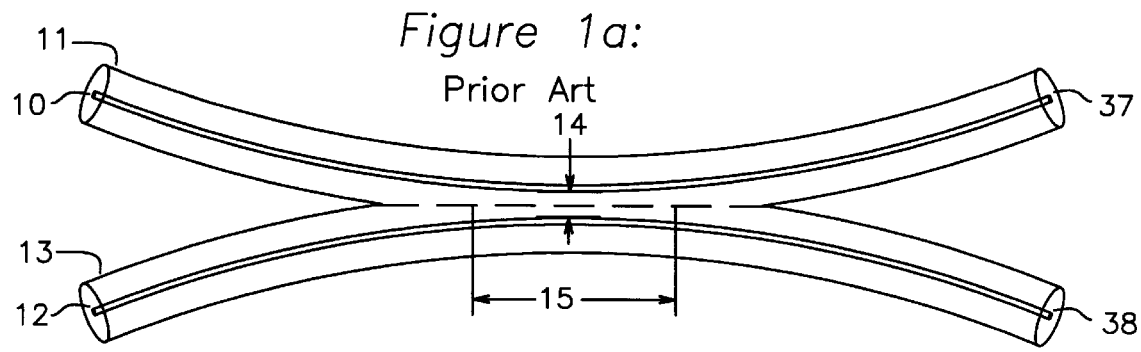
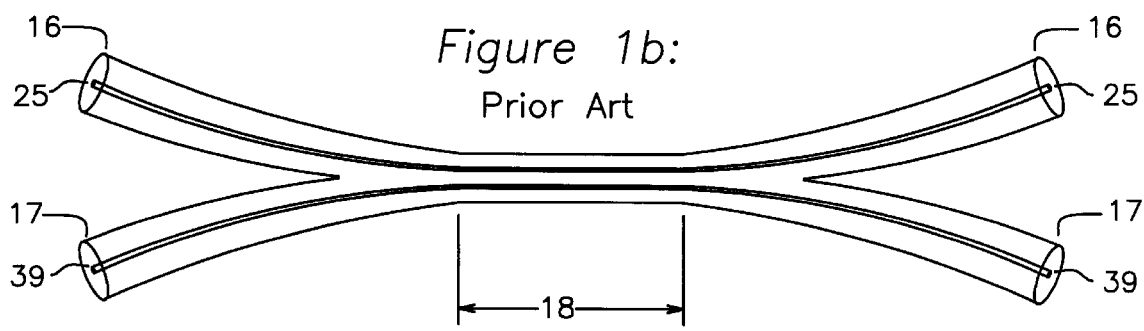
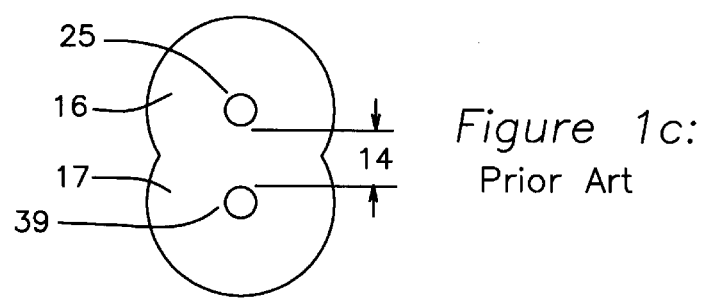

MODE-ROUTED FIBER-OPTIC ADD-DROP FILTER

This application is a division of application Ser. No. 08/813,165 filed on Mar. 7, 1997, now U.S. Pat. No. 5,940,556, issued Aug. 17, 1999.

This invention was made with government support under contract NAS1-20579 awarded by NASA. The government has certain rights in this invention.

FIELD OF THE INVENTION

The current invention applies to the field of optical waveguide, particularly fiber-optic, filtering devices which involve bi-directional conversion of energy between two optical waveguide modes and mode-dependent routing of energy as well as allow the adding and/or dropping of wavelength channels from an optical waveguide bus.

BACKGROUND OF THE INVENTION

Modern optical fiber typically comprises an inner glass core surrounded by a glass cladding and a protective plastic jacket. Guidance of electromagnetic waves is achieved by the core having a slightly higher index of refraction than the surrounding cladding.

Electromagnetic waves that propagate in optical fibers may be decomposed in terms of optical fiber modes. Modes can be either (a) bound core modes which have the majority of their energy confined to the vicinity of the core and can propagate over long distances, or (b) cladding modes or radiation modes which are rapidly attenuated. Optical fibers can be classified as single-mode, two-mode, few-mode, or highly multimode depending on the number of bound core modes that they support.

The number of modes increases with the guidance parameter V which is proportional to the product of (a) the ratio of the core diameter $\phi_{co}$ with respect to the wavelength $\lambda$ and (b) the numerical aperture NA which is related to the difference between the core and cladding refractive indices $n_{co}$ and $n_{cl}$ respectively, i.e., $$V = \pi(\phi_{co}/\lambda)NA$$

where $$NA = (n_{co}^2 - n_{cl}^2)^{1/2}.$$

Typical values for the core diameter are of order 10 μm for single-mode and two-mode or few-mode fiber operating at communications wavelengths of 1300–1550 nm, and 50 μm or 62.5 μm for highly multimode fiber. Whether single-mode or multimode, the cladding diameter has most commonly an overall diameter of 125 μm, and a plastic jacket diameter is typically 250 μm for standard fiber. The glass core is generally doped with germanium to achieve a slightly higher index of refraction than the surrounding cladding by a factor of roughly 1.001. The jacket is generally plastic and is used to protect the core and cladding elements. It also presents an optically discontinuous interface to the cladding thereby preventing coupling modes in the cladding to other adjacent fibers, and usually plays no significant part in the optical behavior of the individual fiber other than the usually rapid attenuation of cladding modes in comparison with bound core modes.

Two-mode fibers have core dimensions of the same order as those for single-mode fibers except that overall the guidance parameter V is slightly larger, e.g., for fibers with a uniform core and cladding indices (known as step index fibers), V is less than 2.4 for single-mode fibers and between 2.4 and 3.8 for two-mode fibers. Note that as well as or use a fiber which is designed to be single-mode at typical telecommunications wavelengths of 1300 nm and 1550 nm will function as two-mode at shorter wavelengths. One can also fabricate fiber with a slightly larger core diameter and/or NA to function as two-mode fiber at the above wavelengths.

As described in the book by Snyder and Love entitled Optical Waveguide Theory published by Chapman and Hall (London, 1983), under the assumptions of longitudinal invariance and small index differences for which the scalar wave equation is applicable, the modal field magnitudes may be written $$\Psi(r,\phi,z) = \Psi(r,\phi) \exp\{i(\beta z - \omega t)\}$$

where $\beta$ is the propagation constant $\omega$ is the frequency t is time z is the axial distance r,$\phi$ is the polar trans-axial position along the fiber.

Single-mode fibers support just one order of bound mode known as the fundamental-mode which we denote as $\Psi_{01}$, and which is often referred to in the literature as $LP_{01}$. The transverse field dependence for the fundamental-mode in the vicinity of the core may be approximated by a gaussian function as $$\Psi_{01}(r,\phi) = \exp\{-(r/r_{01})^2\}$$

where $r_{01}$ is the fundamental-mode spot size. Two-mode fibers support two orders of mode. In addition to the fundamental-mode, two-mode fibers support a second order of bound mode which we denote as $\Psi_{11}$, and which is often referred to in the literature as $LP_{11}$. The transverse field dependence of the second order modes in the vicinity of the core may be approximated as $$\Psi_{11}(r,\phi) = r \exp\{-(r/r_{11})^2\} f_1(\phi)$$

where $r_{11}$ is the second-mode spot size $f_1(\phi)$ is the rotation of the pattern described by $f_1(\phi) = \cos(\phi)$ or $\sin(\phi)$, and the other variables and constants are as described above. The optical fields of second modes spread out further into the cladding, and require fibers with a larger optical fiber core diameter and/or core-cladding index of refraction difference to reduce attenuative effects, compared to fundamental-mode waves, which have less spread in their field patterns, and hence can propagate in optical fibers with smaller core diameters and/or core-cladding index of refraction differences.

While the above equations describe fundamental and second-mode waves in their most common mathematical forms, it is clear to one skilled in the art that other two-mode wave systems are available for separation and aggregation on the basis of modal characteristic, among which (a) the first two Transverse Electric (or Transverse Magnetic) modes of planar waveguides commonly known as $TE_0$ and $TE_1$ (or $TM_0$ and $TM_1$), (b) two polarizations of a given order of mode such as (i) planar waveguide modes $TE_0$ and $TM_0$, and the polarized optical fiber modes known as $LP_{01}^x$ and $LP_{01}^y$, as well as (c) the higher level modes of the waves described here and in the publications and patents cited herein, all of which are incorporated by reference.

Fiber optic filters are well known in the art, and may be constructed using a combination of optical fiber and gratings. Using fiber of the previously described type, there are several techniques for creating fiber optic gratings. The earliest type of fiber grating-based filters involved gratings external to the fiber core, which were placed in the vicinity of the cladding as described in the publication "A single mode fiber evanescent grating reflector" by Sorin and Shaw in the Journal of Lightwave Technology LT-3:1041–1045 (1985), and in the U.S. patents by Sorin et al U.S. Pat. No. 4,986,624, Schmadel et al U.S. Pat. No. 4,268,116, and Ishikawa et al U.S. Pat. No. 4,622,663. All of these disclose periodic gratings which operate in the evanescent cladding area proximal to the core of the fiber, yet maintain a separation from the core. A second class of filters involve internal gratings fabricated within the optical fiber itself. One technique involves the creation of an in-fiber grating through the introduction of modulations of core refractive index, wherein these modulations are placed along periodic spatial intervals for the duration of the filter. In-core fiber gratings were discovered by Hill et al and published as "Photosensitivity in optical fiber waveguides: Application to reflected filter fabrication" in Applied Physics Letters 32:647–649 (1978). These gratings were written internally by interfering two counter propagating electromagnetic waves within the fiber core, one of which was produced from reflection of the first from the fiber endface. However, in-core gratings remained a curiosity until the work of Meltz et al in the late 1980s, who showed how to write them externally by the split-interferometer method involving side-illumination of the fiber core by two interfering beams produced by a laser as described in the publication "Formation of Bragg gratings in optical fibers by a transverse holographic method" in Optics Letters 14:823–825 (1989). U.S. Pat. Nos. Digiovanni 5,237,576 and Glenn 5,048,913, also disclose Bragg gratings, a class of grating for which the grating structure comprises a periodic modulation of the index of refraction over the extent of the grating. Within this class of in-fiber gratings, most of the art is directed to in-fiber gratings having the Bragg plane of refractive index modulation perpendicular to the principal axis of the core of the fiber optic cable. A new class of grating involves in-fiber gratings with an angular offset in the plane of refractive index modulation. This type of angled grating is referred to as a mode-converting two-mode grating, and, with properly chosen angle, has the property of converting fundamental-mode power into second-mode power and visa versa. Whether internal or external, both types of gratings can be fabricated as short-period gratings, or long-period gratings. Short-period gratings reflect the filtered wavelength into a counter-propagating mode, and, for silica based optical fibers, have refractive index modulations with periodicity on the order of a third of the wavelength being filtered. Long-period gratings have this modulation period much longer than the filtered wavelength, and convert the energy of one mode into another mode propagating in the same direction, i.e., a co-propagating mode, as described in the publication "Efficient mode conversion in telecommunication fibre using externally written gratings" by Hill et al in Electronics Letters 26:1270–1272 (1990). The grating comprises a periodic variation in the index of refraction in the principal axis of the core of the fiber, such variation comprising a modulation on the order of 0.1% of the refractive index of the core, and having a period associated with either short or long-period gratings, as will be described later.

Fiber-optic add-drop filters are a class of filter of particular interest in multi-wavelength communications and sensor systems, and are used for adding a wavelength channel to or dropping a wavelength channel from an optical fiber bus carrying signals consisting of multiple wavelength channels.

Optical fiber couplers are well known in the art, and generally comprise two fibers as described above having their jackets removed and bonded together with claddings reduced so as to place the fiber cores in close axial proximity such that energy from the core of one fiber couples into the core of the adjacent fiber. There are currently two main ways of practicing this coupling, as well as a third less-used technique. The first method is the side-polished coupler, wherein the cladding material from each fiber is removed through a mechanical polishing operation, followed by a bonding of the two polished claddings together to allow evanescent coupling between the fiber cores. Generally, these couplers are fabricated from a pair of single-mode, or a pair of multi-mode fibers. The side-polished class of fiber optic coupler is described in publications "Single-mode Fibre Optic Directional Coupler" by Bergh, Kotler, and Shaw in Electronics Letters, 16(7)(1980), and "Determination of Single-mode Fiber Coupler Design Parameters from Loss Measurement" by Leminger and Zengerle in the IEEE Journal of Lightwave Technology, LT-3:864–867 (1985). A new class of side-polished mode-converting couplers is described in "Highly selective evanescent modal filter for two-mode optical fibers" by Sorin, Kim and Shaw in Optics Letters 11:581–583 (1986). This class of coupler is fabricated by polishing and bonding a single-mode fiber with a two-mode fiber. As will be described later, this mode-converting coupler converts fundamental-mode waves in a single-mode fiber into second-mode waves, which are principally coupled into the two-mode fiber. A second method of fabricating optical couplers is a fused tapered coupler wherein the two fibers are placed in close proximity, heated, and drawn together. The fused tapered class of coupler is described by Hill et al in "Optical fiber directional couplers: biconical taper technology and device applications", Proceedings SPIE 574:92–99 (1985) with analysis of their operation given in Bures, Lapierre, Lacroix "Analyse d'un coupleur bidirectionnel a fibres optiques monomodes fusionnees" in Applied Optics 22:1918–1921 (1983).

The third method of making couplers involves etching the cladding as described in "Single-mode power divider: encapsulated etching techniques" by Sheen and Giallorenzi in Optics Letters 4(1):29–31 (1979). Because of reciprocity, optical couplers fabricated from single-mode fiber are intrinsically power-splitting reciprocal devices. The most commonly used coupler involves two coupled single-mode fibers and thus is intrinsically a 4 port device. If such a coupler is used to extract the wavelength band reflected by a single-mode grating, then, because of splitting-loss for the two traversals of non-mode-converting coupler (before and after reflection by the grating), a maximum peak power that can be extracted is 25% of the peak power that would be reflected without the coupler in the system. This least loss case involving approximately 6 dB loss is for a 50/50 splitter known as a 3dB coupler. Cascaded couplers of this type are frequently used in single-mode systems, and the losses can become quite high, and increase for each optical coupling event, as computed for one such system in the publication "Analysis of the reflective-matched fiber Bragg grating sensing interrogation scheme" by Ribeiro et al in Applied Optics 36:934–939 (1997).

SUMMARY OF THE INVENTION

The present invention is directed towards a new class of filtering devices which involves bidirectional conversion between two optical waveguide modes as well as mode-dependent routing to (a) circumvent the splitting loss problem associated with coupling reflected energy out of single-mode waveguides using single-mode couplers, (b) allow efficient addition/dropping of wavelength channels to/from a primary waveguide from/to a secondary waveguide, and (c) provide a basis for modal processing and modal logic systems. The invention is illustrated with respect to the fundamental and second-mode waves in optical fibers using optical elements comprising optical gratings and optical couplers, all fabricated using optical fiber. A first objective of the invention is low loss conversion from the second-mode to the fundamental-mode. A second objective of the invention is low loss conversion from the fundamental-mode to the second-mode. A third objective is the efficient wavelength-dependent extraction of the converted mode into a second fiber using a mode-splitting two-mode coupler to provide the basis for an add-drop filter. A fourth objective is the creation of a wavelength-division multiplexed optical system. Objectives one and two can be achieved with mode-converting two-mode gratings. Methods of realizing objectives three and four include (a) in an all-two-mode-fiber system or subsystem, combining a mode-splitting two-mode coupler with a mode-converting two-mode grating, and (b) in a single-mode-fiber system or subsystem, adding a two-mode-fiber tapping section with a mode-converting grating between two mode-converting single-to-two-mode couplers.

BRIEF DESCRIPTION OF THE DRAWINGS

FIG. 1a is the plan view of a prior art side polished fiber coupler.

FIG. 1b is the plan view of a prior art fused tapered fiber coupler.

FIG. 1c is a section view of a prior art optical coupler.

DETAILED DESCRIPTION OF THE INVENTION

Figure 2:
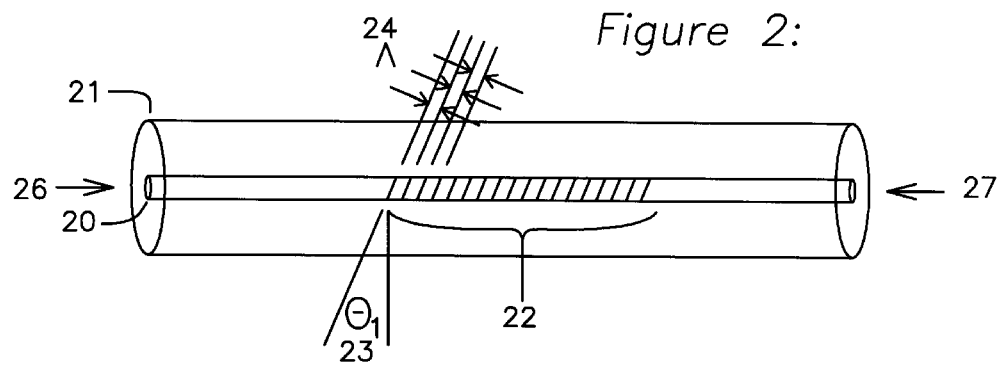
FIG. 2 is an in-fiber two-mode grating.

Referring now to FIG. 1a, there is shown a prior art single-mode optical coupler. For reference, we first examine the characteristics of the single-mode fiber itself. Core 10 and cladding 11 have respectively dimensions of approximately 10 μm and 125 μm, and a ratio of refractive index in the range of 1.001. The protective plastic jacket is not shown as it is typically removed during the process of fabricating the coupler. The coupler is fabricated from a first fiber comprising a core 10 and cladding 11, which is placed adjacent to a second fiber also having a core 12 and cladding 13. There are two methods commonly used to create this adjacency. The first method is side polishing wherein two fibers 11 and 13 are placed in a fixture and a flattened surface is created through the polishing and reduction of claddings 11 and 13, and the two side polished fibers are then placed with side polished surfaces in contact with each other as shown in FIG. 1a. Usually, fibers 11 and 13 are of the same type: either both are single-mode or both are multimode. For a simple single-mode coupler carrying fundamental-mode waves, the energy transfer from a wave presented to port 10 and coupling to port 38 depends on length 15 and proximity 14, and can vary from 0% to 100%. For the case of a mode-converting coupler where core 10 is single-mode fiber and core 12 is two-mode fiber, a fundamental-mode wave presented at port 10 would convert into a second-mode wave within the interface region 15, and in the ideal case, negligible fundamental-mode wave energy would appear at port 37, and all of the converted second-mode waves would be present at port 38. Fundamental-mode wave energy presented to port 38 would not mode-convert, and would appear unmodified at port 12. By duality, second-mode wave energy presented at port 38 would convert to fundamental-mode wave energy appearing at port 10.

The second method of fabricating an optical coupler is to place two fibers 16 and 17 together and heat and draw them as shown in FIG. 1b, thereby necking the claddings 16 and 17, and respective cores 25 and 39, and creating a region of adjacency 18. Most modern couplers are fabricated through the process of heating and drawing the first fiber 16 along with the second fiber 17, until the cross section of the new fused section resembles FIG. 1c, which shows fused claddings 16 and 17, and diameter-reduced cores 25 and 39. Coupling ratios are controlled by both the length of core coupling 18 and core separation distance 14. Typical values vary widely, but may be found to be 10 mm for coupling length 15 and on the order of one to several microns for distance 14. While the process of fabricating a two-mode coupler has been described using fusing of elements, it should be clear to one skilled in the art that any other method of fabrication which places the fiber cores in proximity within the cladding will produce the described two-mode coupler, and such methods include etching, and many other mechanical and chemical means. It has been observed that the coupling function between the two fibers changes with drawing distance and proximity.

For clarity, we will now define the three classes of couplers relevant to this invention. Prior art optical couplers which couple energy from the fundamental mode of a single-mode fiber to the fundamental mode of another single-mode fiber will be referred to as simple optical couplers. Prior art optical couplers which convert from one mode to another will be referred to as mode-converting couplers. The present invention is an optical coupler which selectively couples energy of only one of the two modes of two-mode fiber to the same mode of a second two-mode fiber and will be referred to as mode-splitting two-mode coupler or simply a two-mode coupler.

FIG. 2 shows an in-fiber grating. Core 20 is surrounded by cladding 21, and a modulated index of refraction region 22 is created in the bulk of the core 20 through a variety of techniques, such as exposure to a laser beam with periodically varying intensity along the grating. In the case where angle 23 is 0°, the principal effect of the grating is to reflect the fundamental mode into the counter-propagating version of itself rather than the conversion of modes. With regard to the period of the grating 22, there are two distances in which the grating period may be set for a desired filter function. For transmission of waves through the grating at wavelength $\lambda_b$, the long-period grating function is as follows:

$$\Lambda_b = \lambda_b/(n_1 - n_2)$$

where $\Lambda_b$=pitch of the desired Bragg grating, $\lambda_b$=wavelength to reflect, $n_1$=effective index of refraction of the first mode, $n_2$=effective index of refraction of the second-mode.

In the case of a reflected wave returning to the entry port, a sign reversal occurs for $n_2$, wherein the formula becomes for the short-period grating:

$$\Lambda_b = \lambda_b/(n_1 + n_2)$$

Figure 3A:
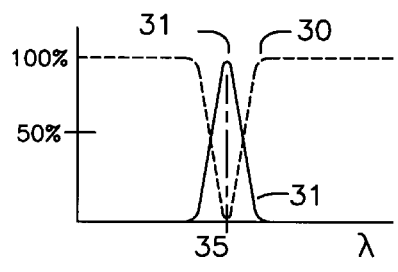
FIGS. 3a–3c shows power transfer curves for a mode-converting two-mode grating.

FIG. 3a is a diagram showing this filtering action for a short-period grating and a fundamental-mode source. For a spectrally flat excitation into input port 26, the resulting transmitted wave energy spectrum is shown as curve 30, while the reflected wave energy is shown as curve 31. It should be noted that this type of filter is capable of very low transmissive and reflective losses. As can be seen, for short-period gratings, the overall behavior is that of a band pass filter for wave energy reflecting back to the input port 26, and a notch filter for wave energy passing on to the output port 27. As the grating is longitudinally and axially symmetric, the labeling of input and output ports is arbitrary, although it would be possible to fabricate a grating without such symmetry to achieve other filtering effects.

Figure 3B:
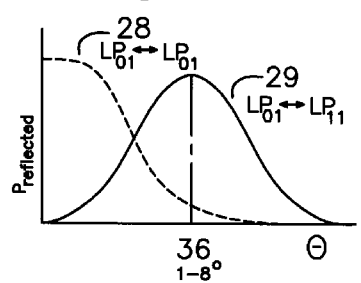
Figure 3C:
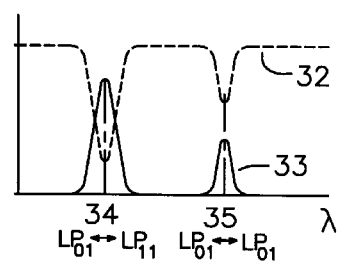
Figure 3D:
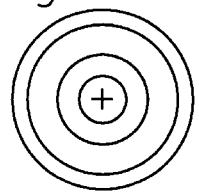
FIGS. 3d–3g shows modal wave energy patterns.
Figure 3E:
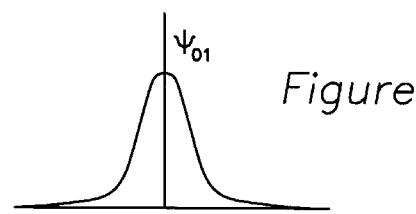
Figure 3F:
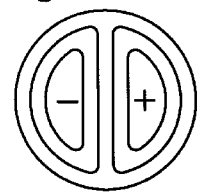
Figure 3G:
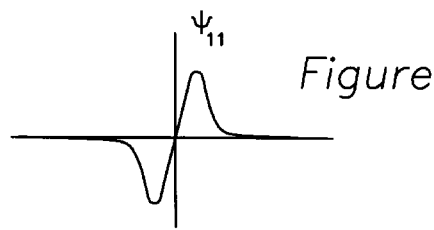

Examining now the effect of changing the angle of modulation, FIG. 3b shows the mode conversion property of the grating 22 as the angle 23 is increased. Referring now to FIG. 3b, the effect of angle Θ 23 is seen in the power reflected at the operating wavelength λ. For single-mode input excitation, curve 28 shows fundamental-mode power reflected as a function of grating angle Θ, while curve 29 shows second-mode power reflected as a function of grating angle Θ. As can be seen from the curves, at the experimentally determined grating angle Θ 36=1–8°, maximum transfer of power from fundamental-mode to second-mode occurs. It is clear that the optimum angle for modal power transfer will vary with different materials, but this is what is observed for commercially available germanium doped silica glass fiber. Given this modal conversion property of the fiber, it can be seen that a fundamental-mode source will return a mixture of fundamental-mode and second-mode energy. FIG. 3c shows this effect for a short-period two-mode grating excited at port 26 by a fundamental-mode source. Reflected power curve 33 now shows two peaks. Reflected fundamental-mode power peak 35 remains at a similar wavelength as from FIG. 3a, but a new reflected power peak at wavelength 34 represents second-mode reflected power created by the two-mode grating 22. Transmitted power curve 32 represents the power transmitted to port 27, and as in the case of the single-mode grating, minimal losses occur. FIG. 3d shows the optical fiber cross section plot of the field magnitude of a fundamental-mode wave pattern $\Psi_{01}$, and FIG. 3e is the corresponding amplitude plot for such a wave. FIG. 3f shows similarly the optical fiber cross section plot of the second-mode wave amplitude for the $\Psi_{11}$ wave pattern, and FIG. 3g is the wave magnitude plot.

Figure 4A:
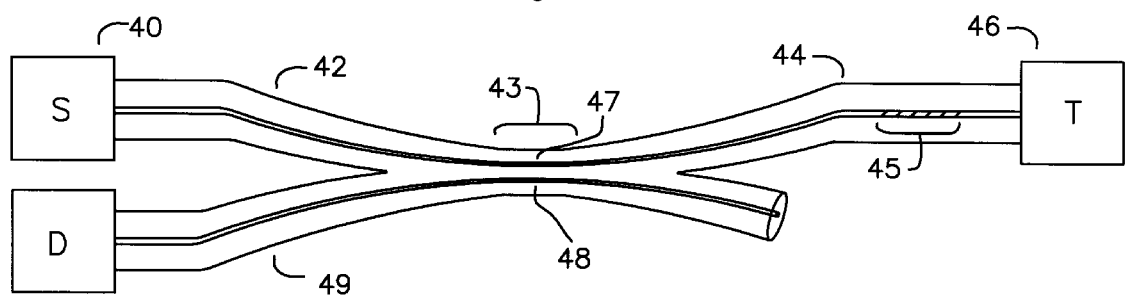
FIGS. 4a–b are the mode-converting wavelength-selective filters.
Figure 4B:
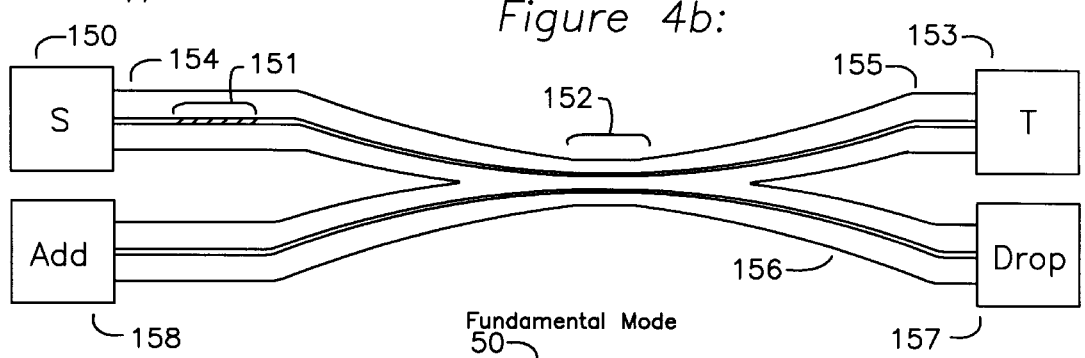

FIG. 4a discloses a key form of the present invention, comprising a two-mode fiber first port 40, two-mode fiber 42 leading to mode-splitting two-mode optical coupler 43, another length of two-mode fiber 44 terminating in short-period mode-converting two-mode grating 45. One port of two-mode coupler 43 is coupled to the wavelength-selective port 41, which has a second-mode output which is obtained by conversion by the grating of the fundamental-mode optical energy from the input source 40. It will be seen that if fundamental-mode wave energy is provided to first port 40, in general, the power reflected by short-period grating 45 with arbitrary grating angle Θ 36 will be a mixture of fundamental-mode and second-mode energy, and the second-mode energy will selectively be coupled by two-mode coupler 43 into fiber 48, and conducted to output port 41, which will be found to contain mostly converted second-mode energy. Conversely, if second-mode energy is provided at port 41, then it will be selectively coupled across two-mode coupler 43 and directed along fiber 44 to short-period two-mode grating 45, wherein the grating will convert such second-mode waves to fundamental-mode waves reflected back to input port 40 via fiber 42. In accordance with the low coupling of fundamental-mode waves across two-mode coupler 43, virtually all of the fundamental-mode wave power reflected by grating 45 will be sent back to port 40. However, in the case where two-mode grating 45 optimized for maximum reflection of second-mode waves compared to fundamental-mode waves, port 46 is an auxiliary port for measurement, and will contain wave energy not reflected by grating 45. FIG. 4b illustrates this same filter device fabricated using long-period mode-converting grating 151. Fundamental-mode waves from source 150 travel through fiber 154, and waves at mode-converting wavelength $\lambda_n$ are converted from fundamental-mode to second-mode waves but continue to propagate towards two-mode coupler 152. Waves not at mode-converting wavelength $\lambda_n$ continue to two-mode coupler 152 without any mode change. Two-mode coupler 152 then couples second-mode waves at wavelength $\lambda_n$ into drop port 157, while non-mode converted fundamental-mode waves continue along fiber 155 to port 153. Second-mode waves furnished to add port 158 couple to fiber 155 in two-mode coupler 152 and travel on to output port 153.

Figure 5:
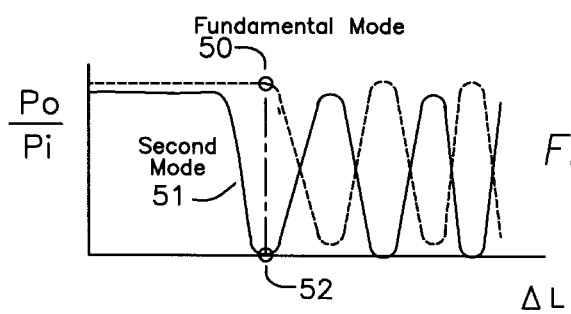
FIG. 5 is the optical coupling characteristic of the mode-splitting two-mode coupler.

An important feature of the optical two-mode coupler is shown in FIG. 5. It was disclosed earlier that one method of fabricating optical couplers involved placing them in proximity to each other and drawing them under elevated temperature. FIG. 5 shows the fundamental-mode transfer function 50 through a first fiber as a function of drawing distance Δl. Also shown is the second-mode transfer function 51 for the same fiber drawn distance Δl. The critical point $l_{opt}$ 52 shows the optimum drawing distance where the second-mode energy reflected by the grating 45 and traveling back to the source 40 in fiber 44 is selectively coupled such that the second-mode wave coupling to fiber 49 is at a maximum, while the second-mode energy remaining in fiber 42 and returning to the source 40 is at a minimum, while virtually all of the fundamental-mode energy continues from 44 to 42 without appreciably coupling to 49. The effect of stopping the drawing process at this critical point creates a mode filter acting on the reflected second-mode energy which passes with minimal attenuation fundamental-mode wave energy, while filtering second-mode wave energy onto the second fiber 49.

In practice, fabrication of the add-drop filter requires all elements of FIG. 4a or 4b to be present, and while port 40 or 150 is illuminated with a fundamental-mode source, the two-mode fibers 47 and 48 comprising the two-mode coupler 43 or 152 are heated and drawn while power is measured at port 41 or 157. At first, no appreciable power is measured at port 41 or 157, and as the claddings begin to fuse, some coupling of power is observed, and as the drawing process begins, a point is reached where second-mode power is maximally coupled to port 41 or 157. At this point, the drawing process stops, as point 52 has been identified, and the add-drop filter is now optimized.

Figure 6A:
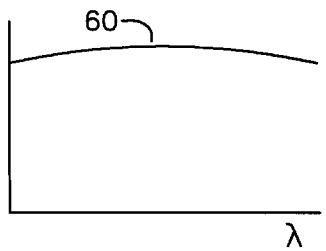
FIG. 6 is a set of spectral density plots for power found at various ports of the mode-converting wavelength-selective filter.
Figure 6B:
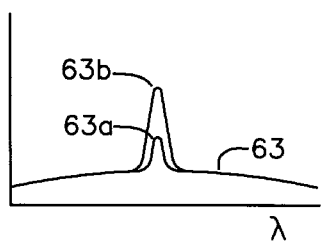
Figure 6C:
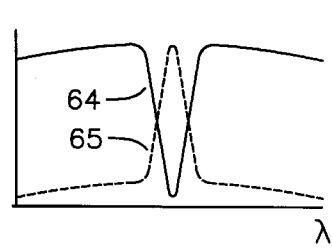

FIG. 6a shows the typical power density spectrum 60 of a broadband fundamental-mode source such as an LED (light emitting diode), which is coupled into port 40. FIG. 6b shows the typical power density spectrum 63 measured at 41 before fusing of element 43 begins, and also shows the progression in spectral density 63a, 63b during fusing and drawing. As more wave energy couples into fiber 48, curves 63a and 63b begin to reflect this increased power level. Curve 65 in FIG. 6c shows the final power density spectrum at the critical coupling point 52, and is the point at which forming of two-mode coupler 43 is terminated. Curve 64 shows the power delivered to port 46.

We claim:

1. An optical mode-converting add-drop wavelength filter comprising:

a two-mode short-period grating having a single port for input and output, said grating converting fundamental-mode wave energy into reflected second-mode wave energy at a specific wavelength;

a two-mode directional optical coupler having an input port and two output ports, the first said output port responsive to wave energy from said input port and coupled to said two-mode short-period grating, and the second said output port responsive preferentially to second-mode energy reflected from said first output port.

2. The mode converter of claim 1 wherein said two-mode short-period grating is a two-mode Bragg grating fabricated in the core of an optical fiber.

3. The mode converter of claim 1 wherein said two-mode short-period grating is an external grating fabricated outside the core of an optical fiber.

4. The mode converter of claim 2 wherein said two-mode optical coupler is fabricated from two optical fibers, said optical fibers modified to enable maximum coupling of second-mode wave energy and minimum coupling of fundamental-mode wave energy.

5. The mode converter of claim 4 wherein said modification comprises heating and drawing said optical fibers.

6. The mode converter of claim 4 wherein said modification comprises mechanical polishing of said optical fibers.

7. The mode converter of claim 4 wherein said modification comprises chemical etching of said optical fibers.

8. An optical mode converter comprising:

a first optical fiber having an input end, a two-mode coupler middle section, and a grating end, said grating end comprising a plurality of refractive index modulations formed into said optical fiber, each of said refractive index modulations being coplanar and at an angle of between 1° and 8° with respect to central axis of said first optical fiber grating end;

a second optical fiber having an output end and a two-mode coupler section, said two-mode coupler section responsive to reflected second-mode waves from said first optical fiber two-mode coupler middle section, and said output end positioned to receive said reflected second-mode waves therein.

9. The mode converter of claim 8 wherein said two-mode coupler section comprises said first optical fiber and said second optical fiber heated and drawn together to satisfy said requirement for maximum coupling of reflected second-mode waves and minimum coupling of fundamental-mode waves.

10. An optical mode-converting device comprising:

an optical fiber supporting both fundamental and second-mode waves having a first port end, a grating middle and an optional second port end, said grating middle comprising a plurality of short-period refractive index modulations formed into said optical fiber, each of said refractive index modulations being coplanar and at an angle of between 1° and 8° with respect to central axis of said optical fiber grating middle, wherein said fundamental-mode waves furnished to said first port end are converted into second-mode waves at a single wavelength and reflected back to said first port end, and all other wavelengths continue to said optional second port end without such mode conversion.

11. The optical mode-converting device of claim 10 wherein said refractive index modulations are coplanar and at an angle chosen to maximize the power level of reflected second-mode waves.

12. An optical mode-converting add-drop wavelength filter having an input, an output, an add port, and a drop port comprising:

a two-mode long-period grating having a first port and a second port, said second port producing second-mode waves converted from fundamental-mode waves furnished to said first port, said first port coupled to said input;

a two-mode directional optical coupler having a source port, said drop port, said add port, and said output port, said drop port selectively responsive to second-mode waves furnished to said source port, and said output port selectively responsive to second-mode waves furnished to said add port, said source port coupled to said two-mode long-period grating second port.

13. The mode converter of claim 12 wherein said two-mode long-period grating is a two-mode Bragg grating fabricated in the core of an optical fiber.

14. The mode converter of claim 12 wherein said two-mode long-period grating is an external grating fabricated outside the core of an optical fiber.

15. The mode converter of claim 13 wherein said two-mode optical coupler is fabricated from two optical fibers, said optical fibers modified to enable maximum coupling of second-mode wave energy and minimum coupling of fundamental-mode wave energy.

16. The mode converter of claim 15 wherein said modification comprises heating and drawing said optical fibers.

17. The mode converter of claim 15 wherein said modification comprises mechanical polishing of said optical fibers.

18. The mode converter of claim 15 wherein said modification comprises chemical etching of said optical fibers.

19. An optical mode converter comprising:

a first optical fiber having sequentially an input end, a long-period grating middle section, a two-mode coupler middle section, and an output end, said grating end comprising a plurality of refractive index modulations formed into said optical fiber, each of said refractive index modulations being coplanar and at an angle of between 1° and 8° with respect to central axis of said first optical fiber grating end;

a second optical fiber having sequentially an add port end, a two-mode coupler section, and a drop port end, said first fiber two-mode coupler section and said second fiber two-mode coupler section placed in close proximity wherein second-mode waves from said add port are coupled to said output port, and second-mode waves converted from said grating middle section are coupled from said long-period grating middle section to said drop port.

20. The mode converter of claim 19 wherein said two-mode coupler section comprises said first optical fiber and said second optical fiber heated and drawn together to satisfy said requirement for maximum coupling of second-mode waves and minimum coupling of fundamental-mode waves.

21. An optical mode-converting device comprising:

an optical fiber supporting both fundamental and second-mode waves having a first port end, a grating middle and a second port end, said grating middle comprising a plurality of long-period refractive index modulations formed into said optical fiber, each of said refractive index modulations being coplanar and at an angle of between 1° and 8° with respect to central axis of said optical fiber grating middle, wherein said fundamental-mode waves furnished to said first port end are converted into second-mode waves at a single wavelength and disposed to said second port end, and all other wavelengths are disposed to said second port end without such mode conversion.

22. The optical mode-converting device of claim 21 wherein said refractive index modulations are coplanar and at an angle chosen to maximize the power level of converted second-mode waves.

23. A mode-splitting two-mode directional optical coupler comprising:

a first two-mode fiber having an input end, a coupled middle section, and an output end;

a second two-mode fiber having an input end, a coupled middle section, and an output end;

a second-mode wave coupling section formed by placing said first fiber coupled middle section with said second fiber coupled middle section and heating and drawing said second-mode wave coupling section until second-mode wave energy applied to input end of said first fiber is maximally coupled to said output end of second fiber, but before fundamental-mode wave energy applied to said first fiber input end begins to appear at said second fiber output end;

said heating and drawing performed while a source of said second-mode wave energy is applied to said input end of first fiber, and a detector of said second-mode wave energy is applied to said output end of second fiber.

24. A mode-splitting two-mode directional optical coupler comprising:

a first two-mode fiber having an input end, a coupled middle section, and an output end;

a second two-mode fiber having an input end, a coupled middle section, and an output end;

a second-mode wave coupling section formed by placing said first fiber coupled middle section with said second fiber coupled middle section and heating and drawing said second-mode wave coupling section until second-mode wave energy applied to input end of said first fiber is maximally coupled to said output end of second fiber, but before fundamental-mode wave energy applied to said first fiber input end begins to appear at said second fiber output end;

said heating and drawing performed while a source of said second-mode wave energy is applied to said input end of said first fiber, and a detector of said second-mode wave energy is applied to said output end of said second fiber, and a detector of said fundamental-mode wave energy is applied to said output end of said first fiber.

25. The mode-splitting two-mode coupler of claims 23 or 24 wherein said heated and drawn section is between 5 mm and 20 mm long.

26. The mode-splitting two-mode coupler of claims 23 or 24 wherein said first two-mode fiber and said second two-mode fiber are separated by a distance of 1 to 5 microns in said heated and drawn section.

* * * * *